UNITED STATES PATENT OFFICE.

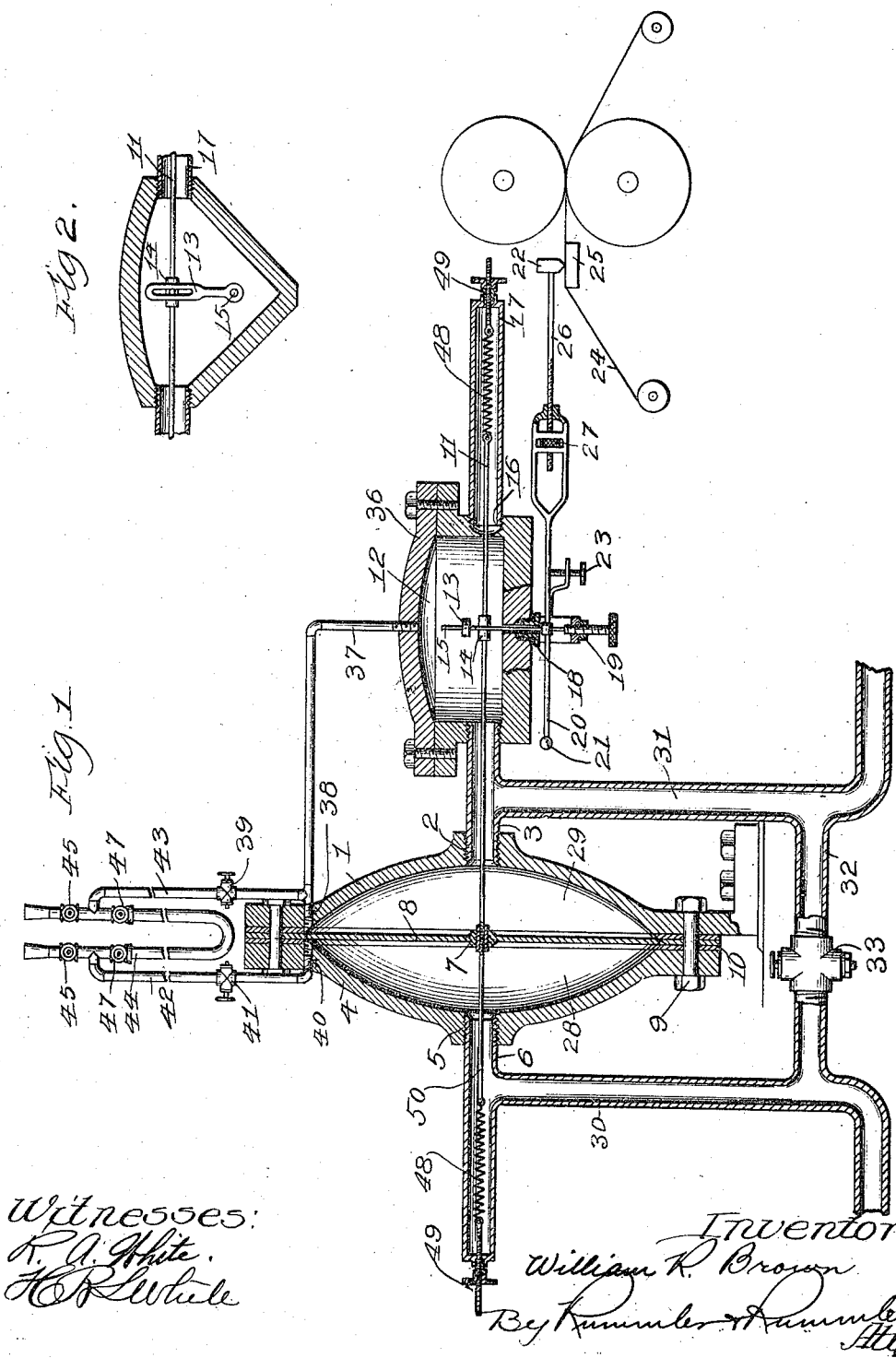

WILLIAM R. BROWN, OF CHICAGO, ILLINOIS, ASSIGNOR, BY MESNE ASSIGNMENTS, TO THE WATER WORKS SPECIALTY COMPANY, A CORPORATION OF SOUTH DAKOTA.

DIFFERENTIAL-PRESSURE GAGE.

1,001,810.   Specification of Letters Patent.   Patented Aug. 29, 1911.

Application filed August 13, 1909. Serial No. 512,703.

*To all whom it may concern:*

Be it known that I, WILLIAM R. BROWN, a citizen of the United States of America, and a resident of Chicago, county of Cook, State of Illinois, have invented certain new and useful Improvements in Differential-Pressure Gages, of which the following is a specification.

The main objects of this invention are to provide an improved form of differential pressure gage adapted to indicate differential pressures, and trace a graphical record thereof, and particularly adapted for use in measuring the flows of liquids by means of Pitot tubes or Venturi meters; to provide improved means for preventing damage to a flexible diaphragm through the pressure thereon; and to provide improved and convenient means for checking or calibrating the indications of the recording device.

A specific construction embodying this invention is illustrated in the accompanying drawings, in which:

Figure 1 is a schematic view of a differential pressure gage, some of the parts being shown in vertical section and some diagrammatically. Fig. 2 is a detail of the connection between the stem of the diaphragm and the shaft which actuates the pen, the inclosing casing being shown in section.

The device shown comprises a closed casing or receptacle having a flexible, resilient diaphragm extending across its interior so as to divide it into two non-communicating compartments, a pair of pipes or tubes for respectively connecting these compartments with sources of fluid pressure, a by-pass extending between the tubes and located at a point between the receptacle and the sources of pressure, a U-tube connected between opposite sides of the receptacle to indicate the difference of pressures on opposite sides of the diaphragm, and means outside the casing for recording the movements of the diaphragm graphically.

In the form shown, the closed receptacle comprises two parts or walls bolted together so as to grip the edges of the diaphragm. Each of these walls is concave toward the diaphragm, the curvature of the walls being such as to correspond to the bending of the diaphragm under static fluid pressure. The curved wall 1 is cast integral with the base plate and is provided with an aperture 2 preferably at its center, and the pipe 3 is connected at this point. The opposite wall 4 is also provided with an aperture 5 to which a pipe 6 is connected. A rubber valve 7 is mounted at the center of the flexible diaphragm 8, and the walls adjacent to the inner ends of the apertures 2 and 5 are shaped to form seats for the valve 7. Bolts 9 connect the walls 1 and 4 and also secure the diaphragm 8 in place. The diaphragm 8 may be of any suitable construction but is preferably of resilient material, such as stretched rubber mounted for convenience between two stiff annular rings 10. This arrangement permits the diaphragm to be removed or replaced without changing the tension on the material of the diaphragm.

The mechanism which records the movement of the diaphragm comprises a stem 11 which is connected to the middle of the diaphragm and extends at right angles to the plane of the diaphragm through the pipe 3 and into a second casing 12, where its movement is communicated to an arm 13, by means of a shoulder or set pin 14 on the stem 11. The arm 13 is mounted on the pen shaft 15, which extends through a stuffing box 18, arranged to permit said shaft to rotate freely, while preventing the escape of liquid from the casing 12. The end of the stem 11 passes through a small aperture 16 in the wall of the casing 12, which aperture serves as a guide for the stem. A blind pipe 17, forming an extension of the casing 12, incloses the stem 11, and permits the same to be entirely surrounded by liquid under the same pressure as that in the main receptacle at the same side of the diaphragm. The lower end of the pen shaft 15 is supported by an adjustable step bearing 19.

The pen arm 20 is rigidly mounted on the shaft 15, and has a balance weight 21 at one end to counter-balance the weight of the marking-pen 22 at its other end. An adjusting screw 23 permits the pen to be adjusted vertically with respect to the chart or paper roll 24, upon which the record is drawn. The paper is moved over the support 25 by suitable clockwork mechanism, not shown. The pen arm 20 is preferably extensible so that the pen may be shifted toward and away from the axis of the shaft 15 for adjusting its rate of movement with respect to that of the stem 11. Adjustment of the length of the pen arm is accomplished by means of an adjusting nut 27, which engages a threaded part of the extension 26 of the arm 20. By means of this adjustment, the movement of the pen may be adjusted for calibrating the instrument or for multiplying the pressures by a constant quantity such as a formula co-efficient.

The chambers 28 and 29 at opposite sides of the diaphragm 8 are connected with pipes 30 and 31 respectively which are arranged to transmit to the respective chambers the liquid pressures whose differences are to be recorded. For instance, the ends of the pipes 30 and 31 may be provided with Pitot tubes, or other means adapted to be inserted into a conduit containing a flowing liquid, and arranged to transmit to the respective compartments the static pressure in the conduit, and the static pressure plus the pressure due to the velocity of the liquid.

In order to prevent injury to the diaphragm, through sudden application of high pressure thereto, the pipes 30 and 31 are connected by means of a by-pass 32 controlled by a valve 33. If this valve is open when the pipes 30 and 31 are subjected to pressure, the pressures at both sides of the diaphragm 8 will be equal, regardless of any difference of pressures at the source or sources of pressure with which the pipes 30 and 31 are connected. By gradually closing the valve 33, the liquid in the chambers 28 and 29 will be gradually brought to the same pressures as those in Pitot tubes which may be connected to the respective pipes 30 and 31.

The cap 36 of the external pressure chamber 12 is arched in order to trap gas at its highest point. A small tube 37 connects this point with a hole tapped in the wall plate 1 at its highest point 38. The two high points being joined by the tube 37 have an outlet valve 39. In a similar manner the pressure chamber 28 is provided with a gas vent 40 at its highest point and a valve 41 controlling the vent. Connected with the valves 39 and 41 are two pipes 42 and 43, which support between them a glass U-tube 44, which is provided for the purpose of holding a colored liquid to indicate the difference in pressures on opposite sides of the diaphragm 8. This colored liquid should be one which is of greater specific gravity from that of which the pressure is being tested. When it is desired to use the U-tube, the blow-off valves 45 are closed. Valves 47 when closed enable the air to be blown off at the valves 45 without risk of losing the colored liquid from the U-tube.

In addition to making the diaphragm 8 of resilient material so that it normally assumes its middle position, the diaphragm is provided with springs 48 which also urge it to this middle position. One of these springs is connected between the end of the stem 11 and an adjusting screw 49, and the other is located at the opposite side of the diaphragm 8 and connected between an extension 50 and an adjusting screw 49. Both the stem 11 and its extension 50 are detachably connected with the diaphragm so as to permit the diaphragm to be readily removed when the two casing parts 1 and 4 are separated.

The operation of the device shown is as follows: Assume for example that the apparatus is to be used for measuring the flow of liquid in a pipe. For this purpose the pipes 30 and 31 are connected with suitable nozzles adapted to be inserted into the pipe and arranged, one for indicating the static pressure of the liquid, and the other for indicating the pressure due to the velocity of flow of the liquid plus the static pressure. The static pressure is usually taken by a straight nozzle which extends into the pipe at right angles to the direction of flow of the liquid therein, and the other is in the form of a bent nozzle or Pitot tube directed along the direction of flow of the liquid. In such case, the straight nozzle indicates the static pressure alone, while the Pitot tube or bent nozzle indicates the static pressure plus the pressure due to the flow. Previous to admitting the liquid to the casing, the by-pass valve 33 is opened so as to prevent damage to the flexible diaphragm 8. After the connections have been made, the by-pass valve 33 is gradually closed, and the resulting motion of the pen arm 20 is noted. In case the difference in pressure comes within the range of the flexible diaphragm, the by-pass valve 33 is completely closed. In order to secure accurate results, the valves 39 and 41 are opened long enough to completely fill the pipes and spaces with the liquid under pressure, thus eliminating all bubbles of air or gas which would tend to produce misleading results, as is well known. The difference in pressure in either direction will be recorded by a movement of the stem connected to the center of the diaphragm, and the multiplied motion of the diaphragm through the action of the pin 14 and the guide arms which form the link 13, cause a rotation of the pen shaft 15. The only unbalanced pressure due to this system is the pressure of the liquid on the cross section of the pen shaft. Said pressure is borne by the step bearing 19 and under usual conditions the friction due to this pressure is so slight that it may be neglected. In case the difference in the pressures between the chambers 28 and 29 should exceed the limit of the motion of the flexible diaphragm 8, the valve 7 engages the valve seat and closes one of the pipes 30 or 31. In either case, the stoppage of the flow through the pipes 30 or 31 prevents injury to the diaphragm.

The U-tube is particularly valuable for calibrating and for testing the accuracy of the recording devices, and being connected at the highest part of the casing, it serves as a convenient means for enabling the operator to detect and get rid of bubbles of air that may accumulate in the chambers.

Although but one specific embodiment of this invention is herein shown and described, it will be understood that numerous details of the construction shown may be altered or omitted, within the scope of the following claims, without departing from the spirit of this invention.

I claim:—

1. In a differential pressure gage, the combination of a closed receptacle, a flexible diaphragm subdividing said receptacle into two compartments, pipes connecting said compartments with sources of fluid pressure, a valved by-pass connecting said compartments, mechanism for indicating the movements of said diaphragm, and means actuated by said diaphragm for automatically cutting off communication between said receptacle and one of said pipes through the movement of the diaphragm.

2. In a differential pressure gage, the combination of a closed receptacle, a flexible diaphragm subdividing said receptacle into two compartments, pipes connecting said compartments with sources of fluid pressure, a valved by-pass connecting said compartments, mechanism for indicating the movements of said diaphragm, and a valve carried by said diaphragm and adapted to cut off communication between said receptacle and one of said pipes through the movement of said diaphragm.

3. In a differential pressure gage, the combination of a closed receptacle, a movable partition therein, subdividing the interior into two separate, non-communicating compartments, individual tubes connecting said compartments with sources of liquid pressure, means normally urging said partition to a certain middle position, said partition being movable through differences of pressures on the opposite sides thereof, a stem connected with said partition, a shoulder on said stem, a casing surrounding said stem, a shaft extending into said casing adjacent to said stem, an arm carried by said shaft and adapted to have sliding engagement with said shoulder for rotating said shaft through the movement of said stem, and an indicator arm actuated by said shaft.

4. The combination of a closed receptacle, a vertically disposed, movable diaphragm subdividing said receptacle into two compartments, means normally urging said diaphragm to a certain middle position, said diaphragm being arranged to move to an extent varying with the difference of pressures at the opposite sides thereof, means for automatically indicating the movements of said diaphragm, a U-tube and means adapted to connect said U-tube with said receptacle at opposite sides of said diaphragm and adapted to contain a liquid to indicate the changes in the pressures in said receptacle.

5. In a differential pressure gage, the combination of a closed receptacle, a movable partition subdividing said receptacle into two compartments and adapted to be moved to an extent varying with the difference between the fluid pressures on opposite sides thereof, pipes connecting said compartments with sources of fluid pressure, a valved by-pass connecting said pipes to each other, and mechanism for indicating the movements of said partition, said partition being vertically disposed, a U-tube and means adapted to connect said U-tube with said receptacle at opposite sides of said partition and at the uppermost points of the respective compartments.

6. In a differential pressure gage, the combination of a closed receptacle, a movable partition subdividing said receptacle into two compartments and adapted to be moved to an extent varying with the difference between the fluid pressures on opposite sides thereof, pipes connecting said compartments with sources of fluid pressure, a valved by-pass connecting said pipes to each other, mechanism for indicating the movements of said partition, a pair of pipes respectively connected to the uppermost points of the compartments at opposite sides of said partition and extending upward therefrom, a U-tube having the upper ends of its legs respectively connected to said pipes, valves controlling communication between said U-tube and receptacle, and blow-off valves above the connections between said U-tube and pipes.

7. In a differential pressure gage, the combination of a closed receptacle, a movable partition subdividing said receptacle into two compartments and adapted to be moved to an extent varying with the difference between the fluid pressures on opposite sides thereof, pipes connecting said compartments with sources of fluid pressure, a valved by-pass connecting said pipes to each other, mechanism for indicating the movements of said partition, said mechanism comprising a stem connected with said partition, a closed casing surrounding said stem and communicating with the adjacent compartment of said receptacle, a shaft journaled in said casing and extending outwardly therefrom, means interposed between said shaft and stem for rotating said shaft through the movement of said partition, and means connected with the outer part of said shaft for indicating the movements of said partition.

8. In a differential pressure gage, the combination of a closed receptacle, a movable partition subdividing said receptacle into two compartments and adapted to be moved to an extent varying with the difference between the fluid pressures on opposite sides thereof, pipes connecting said compartments with sources of fluid pressure, a valved by-pass connecting said pipes to each other, mechanism for indicating the movements of said partition, said mechanism comprising a stem connected with said partition, a closed casing surrounding said stem and communicating with the adjacent compartment of said receptacle, a shaft journaled in said casing and extending outwardly therefrom, means interposed between said shaft and stem for rotating said shaft through the movement of said partition, an arm carried on the outer part of said shaft, and an indicating instrument mounted on said arm, said instrument being adjustable toward and away from said shaft for calibrating the instrument.

9. In a differential pressure gage, the combination of a closed receptacle, a flexible and elastic diaphragm subdividing said receptacle into two compartments, pipes connecting said compartments with sources of fluid pressure, a valved by-pass connecting said pipes, mechanism for indicating the movements of said diaphragm, and means actuated by said diaphragm for preventing injury to the diaphragm through an excess of pressure thereon.

Signed at Chicago this 10th day of August 1909.

WILLIAM R. BROWN

Witnesses:
EUGENE A. RUMMLER,
EDWIN PHELPS.